Patented Nov. 21, 1933

1,936,457

UNITED STATES PATENT OFFICE 1,936,457

THERAPEUTIC COMPOUND

Winford P. Larson, Minneapolis, Minn., and Mortimer Bye, Cincinnati, Ohio, assignors to The Wm. S. Merrell Company, Cincinnati, Ohio, a corporation of Ohio No Drawing. Application February 4, 1931
Serial No. 513,355

5 Claims. (Cl. 167—68)

The disclosure herein deals with discoveries relating to the action of certain salts of unsaturated fatty acids and particularly to the discoveries of the beneficial effects produced by the use of the soluble alkaline salts of ricinoleic acid. in combating toxic and infectious conditions in animals and men. This application is a continuation in part of the co-pending application, Serial No. 359,712, filed May 1, 1929.

We have discovered that neither the ricinoleic acid alone, nor any of the soluble alkaline salts alone will produce the remarkable effects provided by the use of the said salts of ricinoleic acid. From this it is understood and believed to be the ricinoleate fraction of the compound which is active upon the toxins although for general use the introduction upon and into the mucosa, tissues, and blood-stream of the animal body for combating the toxic condition in or on the body and bloodstream without destroying the antigenic properties of pathogenic organism it is believed best and safest to employ the soluble alkaline salts in preparing the compound of the invention.

By the statement, into the mucosa, tissues and bloodstream of the animal body, is intended not only intravenous injection, but also the application of the said salts of unsaturated fatty acids to such subcutaneous mucosa, and tissues as may be exposed as the result of wounds, operations, infections and the like.

The salts of ricinoleic acid are compounded with a vehicle properly adapted to the particular mode of administration or application indicated by the nature and location of the infection or toxic condition present in the body to be treated.

The salts which may be employed with ricinoleic acid for the compound of this invention include potassium, sodium, ammonium, lithium, rubidium, and caesium, all of which are embraced in what is chemically known as the alkaline metal group. The ricinoleates of these several salts are soluble at body temperature or lower, wherefore they are usable for internal and intravenous administration as well as for external application to body tissues.

As indicated previously the nature of the administration or application controls, to a large degree the kind and nature of the vehicle used.

For example in treating gastro-intestinal disorders, especially disorders of the colon, we may use potassium ricinoleate or sodium ricinoleate or a ricinoleate prepared with any other of the salts mentioned and admix it with mineral or vegetable oils, suitable doses being then encased in gelatin capsules. The capsule passes through the stomach and liberates the soluble alkaline salt of ricinoleic acid in the lower intestine where the intestinal mucosa and intestinal flora may be acted upon.

For this compound it may be stated that from one or more parts of the selected salt of ricinoleic acid may be used with twenty or fewer parts of the desired vehicle to attain good results.

For intravenous use the vehicle may be simply distilled water or an isotonic salt solution; the proportion of potassium ricinoleate, sodium ricinoleate or other of the mentioned alkaline soluble salts of ricinoleic acid varied according to the judgment of the physician.

The compound may also be prepared in liquid forms for internal, external and local application in which cases the liquid vehicle may contain various aromatics, and alleviative substances flavorings and the like, which are frequently used in liquid compounds for the several different uses. It will also be understood that the soluble alkaline salts of ricinoleic acid may be made into compounds with powdered and colloidal bases suited to such modes of application as usually or preferably indicate powder or ointment forms.

The compound of the invention is not to be considered as restricted in its nature to any particular form or kind of vehicle since the latter may be varied widely without losing the germicidal and detoxicant properties thereof.

With a vehicle suited to the manner of application in treating various conditions in and on the body and bloodstream the compound of the invention is useful for its germicidal and detoxifying properties in conditions where, when infections and toxins are actually present without destruction of the antigenic properties of pathogenic organisms.

What we claim is:

1. A detoxicant therapeutic compound comprising a soluble alkaline salt of ricinoleic acid for introduction into the mucosa, tissues and bloodstream of the human and the animal body, which compound combats the toxic condition in the body and bloodstream when infections are actually present without destroying the antigenic properties of pathogenic organisms.

2. A detoxicant therapeutic compound for internal use comprising the alkaline salts of ricinoleic acid which are water soluble at temperatures up to the body temperature of man and animals.

3. A detoxicant therapeutic compound comprising potassium ricinoleate for introduction into the blood stream, tissues and mucosa of the human and animal body, which compound combats the toxic condition in the body and blood stream when infections are actually present without destroying the antigenic property of the pathogenic organisms.

4. A detoxicant therapeutic compound comprising ammonium ricinoleate for introduction into the blood stream, tissues and mucosa of the human and animal body, which compound combats the toxic condition in the body and blood stream when infections are actually present without destroying the antigenic property of the pathogenic organisms.

5. A detoxicant therapeutic compound comprising lithium ricinoleate for introduction into the blood stream, tissues and mucosa of the human and animal body, which compound combats the toxic condition in the body and blood stream when infections are actually present without destroying the antigenic property of the pathogenic organisms.

WINFORD P. LARSON.
MORTIMER BYE.